Aug. 16, 1966     S. SHAPIRO     3,266,063

BEDSPREAD

Filed July 12 1965

INVENTOR.
SIDNEY SHAPIRO
BY *J. Walton Bader*
ATTORNEY

United States Patent Office 3,266,063
Patented August 16, 1966

3,266,063
BEDSPREAD
Sidney Shapiro, New York, N.Y., assignor to Inventions of North America, Limited, Ottawa, Ontario, Canada, a corporation of Canada
Filed July 12, 1965, Ser. No. 470,987
2 Claims. (Cl. 5—334)

This invention relates to a bedspread, which, when placed upon a bed, causes the bed to resemble a three dimensional object of another type.

Conventional bedspreads have been utilized in order to make the relatively ugly bed into a decorative piece of furniture. Various types of decorative motifs have been utilized to do so. However, to the knowledge of the inventor, no one has ever attempted to make a bedspread of such construction which, when draped over a bed, will make the bed resemble a different three dimensional object such as an automobile, a treasure chest, a ship, or the like.

The instant invention is also particularly applicable for use in the furnishing of a child's room. Since the bed when covered by the bedspread of this invention resembles a different three dimensional object the child's imagination can be stimulated to the point wherein the parent will have no difficulty in causing the child to go to bed.

The instant invention also has the object of converting a normal bedspread into a child's toy. A child can, if it desires, actually "play games" with the bedspread by, for example, getting into the automobile, opening the treasure chest, etc.

The above sets forth a brief description of the instant invention and the objects and advantages thereof.

The invention will now be described by reference to the accompanying drawings which are made a part of this specification.

Figure 1:
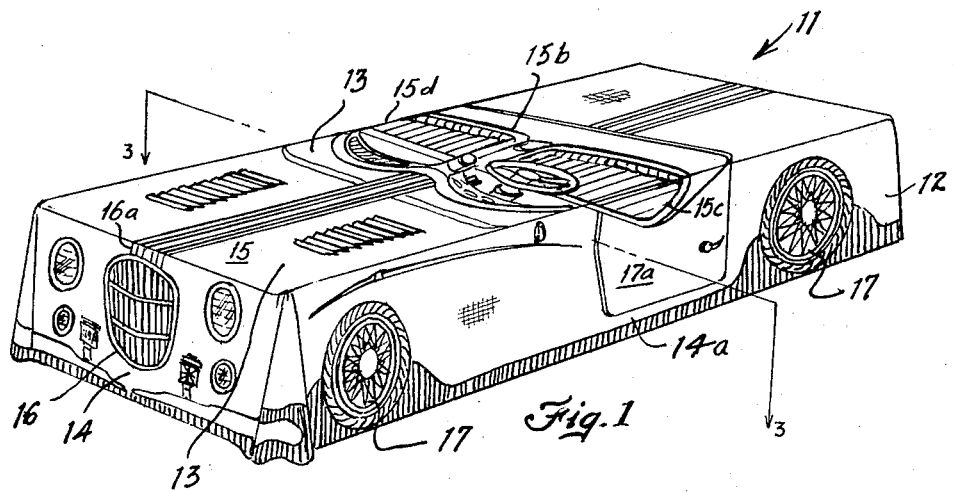
FIG. 1 is a perspective view of a bedspread made in accordance with this invention with the ornamental design upon the bedspread resembling an automobile in the position that the bedspread normally assumes when draped over a bed.
Figure 2:
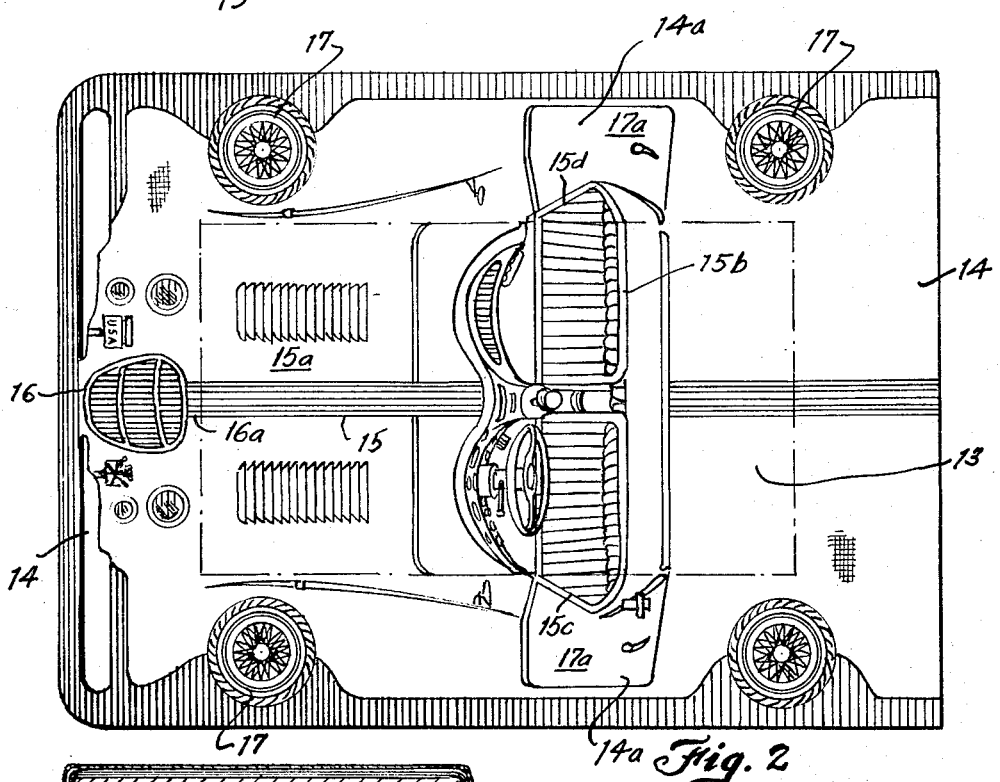
FIG. 2 is a plan view of the bedspread of FIG. 1 in its normal flat position.

A detailed description of this invention which represents the best mode known to the inventor of taking advantage of the same will now be set forth by reference to the specific form of the invention shown in the accompanying drawings. In this connection, however, the reader is cautioned to note that such specific form is set forth for illustrative purposes and for purposes of example only. Various changes and modifications may obviously be made within the spirit and scope of this invention and would occur to those skilled in this art.

The bedspread 11 of this invention is substantially flat and is preferably formed of a woven, knitted, or other type of fabric made of cotton, wool, or synthetic materials. Bedspread 11 is formed with a body 12 which bears a top portion 13 a plurality of side portions 14a thereupon and a front portion 13. Top portion 14 bears a planar design 15 thereupon which can be produced by printing, weaving or any other type of conventional design application. Design 15 represents the upper portion of a three dimensional object (in this case an automobile). Design 15 comprises a portion 15a which represents the hood of an automobile and a portion 15b which represents the seat of an automobile. Portion 15b includes additional portions 15c and 15d which extend partially over side portions 14a. This gives the illusion of depth when the bedspread is draped over a bed.

The front portion 14 bears a planar design 16 which represents the front portion of the three dimensional object (in this case the grille and headlights of an automobile). Design 15a includes a portion 16a which extends downwardly along front portion 14. This represents a continuation of the hood of the automobile and heightens the illusion of depth. The two opposite side portions 14a bear ornamental designs 17 and 17a (in this case representing the wheels and doors of an automobile).

Figure 3:
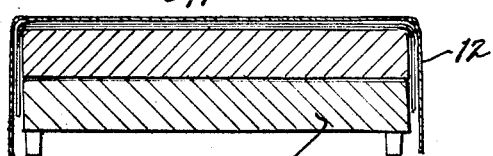
FIG. 3 is a sectional view of the structure shown in FIG. 1 taken along lines 3—3 of FIG. 1.

When cover 11 is draped over a bed 18 as shown in FIGS. 1 and 3 design 16 represents the front of an automobile, design 15 the upper portion thereof and design 17 and 17a respectively the doors and wheels thereof. Thus the bed and bedspread combination now strongly resembles a three dimensional automobile rather than a conventional bed and bedspread combination.

Similarly the combination could be made to resemble a treasure chest or other three dimensional object.

I claim:
1. An integral bedspread comprising a substantially flat body having an upper portion, a front portion, and a plurality of side portions, said upper portion of said body having a planar design positionally inscribed thereupon of the hood and seat portions of a vehicle, each of the side portions of said body having a planar design positionally inscribed thereupon of the wheel portions of a vehicle, the representation of the seat portion of said vehicle upon the upper portion of said body extending downwardly along at least one of the side portions of said body so as to give an apparent depth dimension thereto, the front portion of said body having a planar design positionally inscribed thereupon of the grille and headlight portions of a vehicle; said bedspread, when draped upon a bed, causing said bed to take the realistic dimensional form of said vehicle.

2. An integral bedspread comprising a substantially flat body having an upper portion, a front portion, a rear portion, and a plurality of side portions, said upper portion of said body having a planar design positionally inscribed thereupon of the hood and seat portions of a vehicle, each of the side portions of said body having a planar design positionally inscribed thereupon of the respective wheel and door portions of a vehicle, the representation of the seat portion of said vehicle upon the upper portion of said body extending downwardly along at least one of the side portions of said body so as to give an apparent depth dimension thereto, the front portion of said body having a planar design positionally inscribed thereupon of the grille and headlight portions of a vehicle, the representation of the hood portion of said vehicle upon the upper portion of said body extending downwardly along the front portion of said body also so as to give an apparent depth dimension, said bedspread, when draped upon a bed, causing said bed to take the realistic dimensional form of a vehicle.

References Cited by the Examiner
UNITED STATES PATENTS

| | | | |
|---|---|---|---|
| 3,082,437 | 3/1963 | Upthagrove | 5—344 |
| 3,099,443 | 7/1963 | Koch | 272—1 |
| 3,120,721 | 2/1964 | Bukatman et al. | 5—334 X |

FRANK B. SHERRY, Primary Examiner.

A. M. CALVERT, assistant Examiner.